June 24, 1930.　　　A. G. REDMOND　　　1,766,687
FUEL FEEDING SYSTEM FOR MOTOR VEHICLES
Filed June 15, 1927　　　2 Sheets-Sheet 2
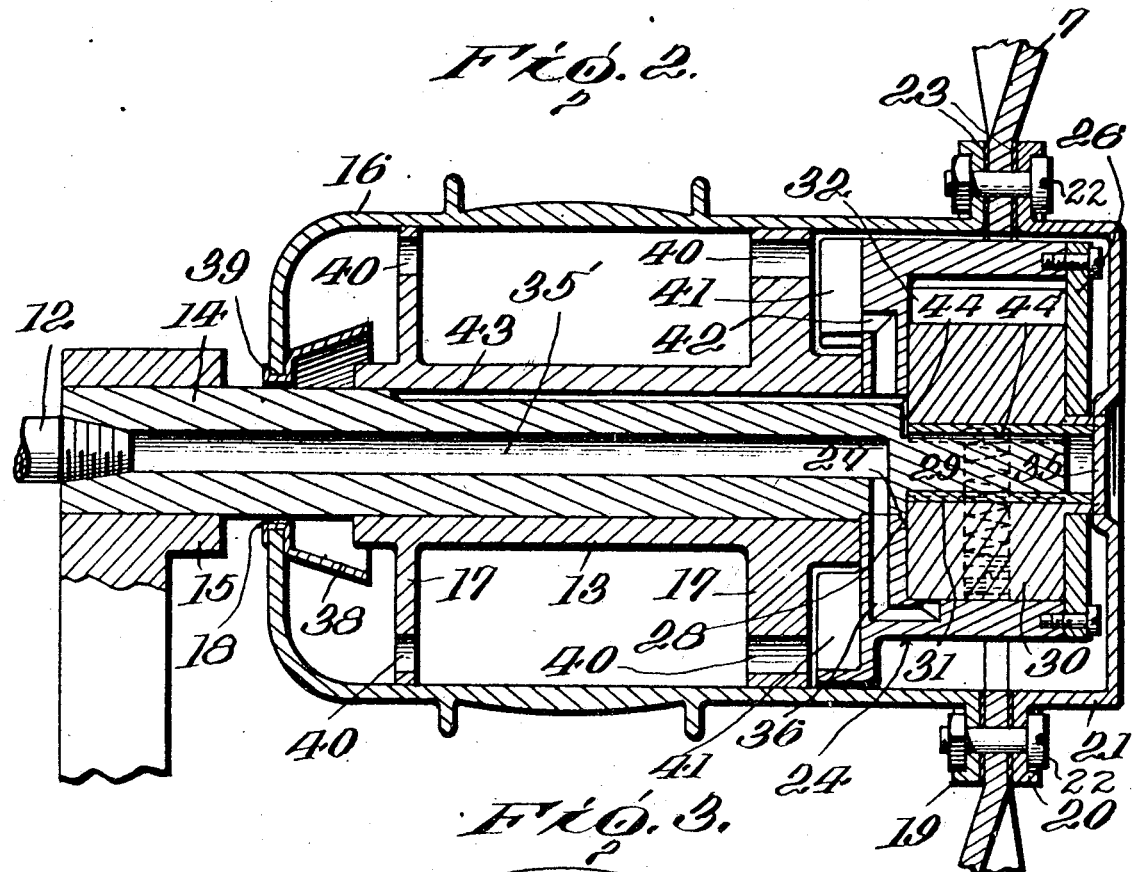
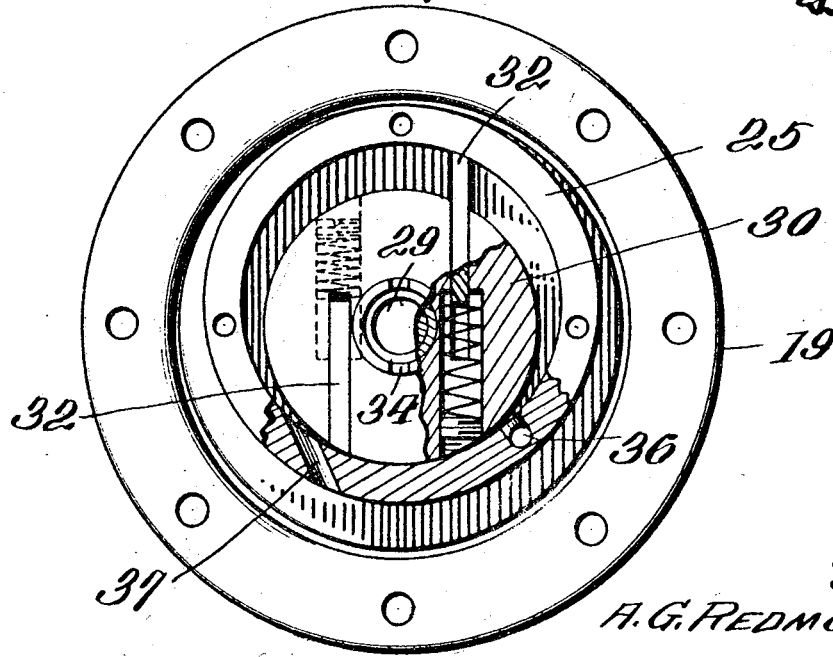
Inventor
A. G. REDMOND.
By
Attorney Patented June 24, 1930

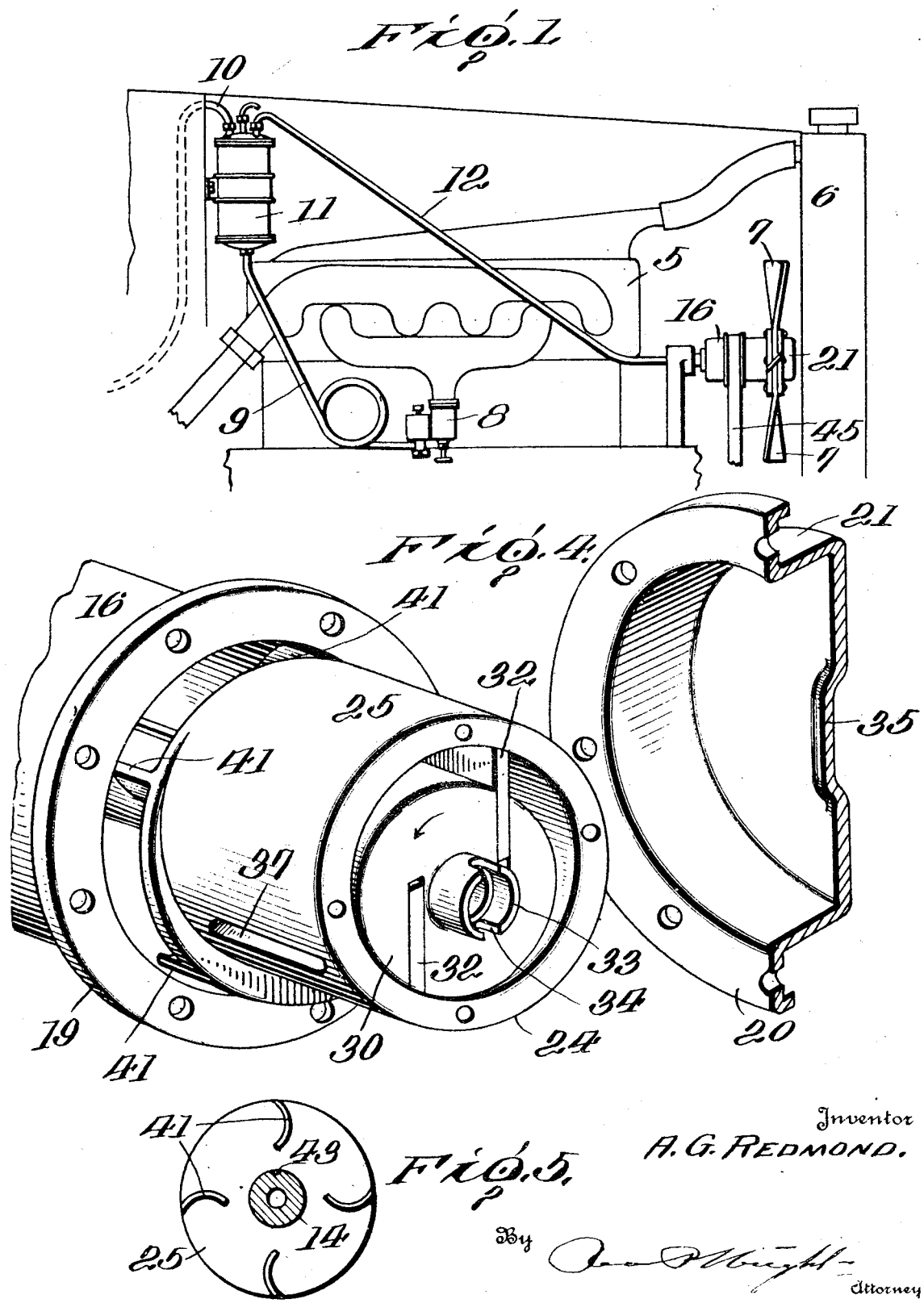

1,766,687

UNITED STATES PATENT OFFICE

ALBERT G. REDMOND, OF FLINT, MICHIGAN, ASSIGNOR TO JACOB RICHARD FRANCIS, OF FLINT, MICHIGAN

FUEL-FEEDING SYSTEM FOR MOTOR VEHICLES

Application filed June 15, 1927. Serial No. 199,115.

This invention relates to improvements in the type of device for supplying a continuous vacuum for use in connection with conventional types of vacuum fuel feed tanks, and more particularly to devices of the general character as disclosed in my copending application filed June 15, 1927, Serial No. 199,114.

The object of the present invention is primarily to simplify and to reduce to a more practical and economical embodiment, the type of vacuum supplying arrangement disclosed in my above mentioned copending application.

A further object of the invention is to provide a pump of the rotary type which is so combined with the hub portion of the cooling fan of an explosive engine as to afford an adequate degree of vacuum to assure a continual supply of fuel regardless of the speed and load conditions of the engine.

Another object is to furnish a pump of such construction as to afford a high degree of efficiency, and at the same time, one which requires no attention nor care.

A further object is to provide in connection with the pump and fan hub, a lubricating means which will effectively maintain both parts thoroughly lubricated during the periods of operation.

With the foregoing objects outlined and with other objects in view which will appear as the description proceeds, my invention consists in the novel features hereinafter described in detail, illustrated in the accompanying drawings, and more particularly pointed out in the appended claims.

Referring to the drawings,

Fig. 1 is a partial side elevation of a motor vehicle, showing the engine, vacuum tank and fan.

Fig. 2 is an enlarged detail section, taken axially through the hub of the fan.

Fig. 3 is an end elevation of the hub, the cover plate of the shell thereof being removed, as well as the cover plate of the pump cylinder, parts of the latter being shown in section.

Fig. 4 is a detail perspective of the extremity of the hub shell, the pump being partially withdrawn and shown with the cover plate removed, the cover plate of the hub shell being partially in section.

Fig. 5 is a detail showing the arrangement of the vanes on the pump cylinder.

Referring to the drawings in detail, the numeral 5 indicates the usual explosive engine of a motor vehicle, associated with the radiator 6, and equipped with the usual cooling fan 7. Fuel is supplied to the carburetor 8 of the engine, through pipe connections 9 and 10, the usual fuel tank (not shown) by the vacuum feed tank 11.

According to the present invention, instead of connecting the vacuum tank 11 with the inlet manifold of the engine, to obtain the necessary vacuum for lifting the fuel from the storage tank to the tank 11, the latter is connected through a pipe 12 with a pump operated by the fan 7.

The hub part 13 of the fan is journaled on a stationary shaft 14, suitably supported in an arm 15, and a shell-like casing 16 is carried by the flanges 17 of the hub, and completely encloses one end of the shaft. At its opposite extremity, the shell 16 is arranged in spaced relation to the shaft 14, to provide a passage 18 for the discharge of air, as will be hereinafter more fully described. The front extremity of the shell is flanged as at 19, and the flanged edge 20 of the shell cover 21 is bolted thereto as at 22, to facilitate removal. The hub of the blades 7 constituting the fan, are clamped between the flanges 19 and 20 with interposed gaskets 23 to present a fluid tight joint.

The pump 24 is supported on the front extremity of the shaft 14 in the space between the hub part 13 and the shell cover 21, and is constituted by the cylinder 25 having an open side normally closed by a bolted cover plate 26. The opposite side wall of the cylinder is apertured and slipped over the adjacent portion of the shaft 14 against an annular shoulder 27 thereon, and the cylinder is permanently fixed on the shaft by upsetting the material of the latter over the inner surface of the pump wall, as inbe unable to overcome the force of the spring controlling the valve.

It may be advisable therefore, to operate the outlet valve by a relay as shown in Figs. 2 and 3. In Fig. 2, $d$ represents the diaphragm controlling the relay. The diaphragm may be replaced by a piston if desired. The wet steam enters tangentially at A, taking a whirling course, and the internal pressure caused by the rotation of the accumulated water displaces the diaphragm and allows the operating medium to pass from the space $f$ into the space $e$. The pipes $g$ and $h$ are thus put into communication so that the operating medium supplied to the former from an auxiliary source, obtains access to the piston $i$ and thus opens the valve $a$. The space $k$ is connected with the interior of the separator by the pipe $l$ which is so arranged that it transmits the steam pressure only. Thus, under normal conditions, the pressure in $k$ is the same as that in the separator, and the diaphragm is displaced only when an additional pressure is produced in the interior of the separator by the action of the water. The action of the diaphragm may be rendered more stable by the addition of a spring $n$. The steam from which the water has been extracted leaves at B.

The steam trap $o$ serves to discharge small accumulations of water when the quantity is insufficient to open the valve $a$.

What I claim is:

1. In a separator, the combination with a receptacle, of means for revolving a body of liquid therein, an outlet valve, and means operable by centrifugal pressure of the revolving liquid for opening the valve.

2. In a separator, the combination with a vessel of circular cross section, of a fluid inlet entering the same tangentially, a valve controlled outlet near the bottom of the vessel, and valve control means responsive to centrifugal pressure of liquid in the vessel.

3. In a separator, the combination with a separating vessel of circular cross section, of a fluid inlet conduit arranged to induce revolution of fluid in the vessel, and an outlet valve device, said device including an element operable by pressure of revolving liquid in the vessel.

4. In a separator, the combination with a separating vessel having an inlet entering it in tangential direction, of an outlet near the bottom of the vessel, and means responsive only to a predetermined lateral pressure in the vessel for controlling said outlet.

5. In a separator, the combination with a separating vessel having an inlet entering it in tangential direction, of a pressure responsive member at a lateral wall of the vessel, and an outlet valve under control of said member.

6. In a separator, the combination with a separating vessel having a lateral inlet and two outlets, of means operable by a predetermined lateral pressure of liquid in the vessel for controlling one of said outlets, and means, operable by a quantity of liquid in said vessel insufficient to operate said first-named means, for controlling the other of said outlets.

7. In a separator, the combination with a separating vessel having a lateral inlet and an outlet near the bottom, of a valve controlling said outlet, actuating means for the valve, and a control device, for the actuating means, said control device being responsive to pressure of liquid in the vessel.

8. In apparatus for separating a mixture of vapor and liquid into its respective constituents, a chamber provided with an inlet for said mixture and outlets for the separated vapor and liquid, the mixture inlet being so disposed as to effect whirling movement of the separated liquid in said chamber by the action of the inflowing mixture, valve means for controlling the liquid outlet, and means including a diaphragm for governing said valve means, said diaphragm being independent of the vapor pressure in said chamber and responsive to pressure conditions incident to the whirling movement of the separated liquid.

9. In apparatus for separating a mixture of vapor and liquid into its respective constituents, a chamber provided with an inlet for said mixture and outlets for the separated vapor and liquid, the mixture inlet being so disposed as to effect whirling movement of the separated liquid in said chamber by the action of the inflowing mixture, valve means for controlling the liquid outlet, and means for governing said valve means and including an actuating member responsive to pressure conditions incident to the whirling movement of the separated liquid.

10. In apparatus for separating a mixture of vapor and liquid into its respective constituents, a chamber provided with an inlet for said mixture and outlets for the separated vapor and liquid, the mixture inlet being so disposed as to effect whirling movement of the separated liquid in said chamber by the action of the inflowing mixture, valve means for controlling the liquid outlet, and means for governing said valve means and including an actuating member responsive to pressure conditions incident to the whirling movement of the separated liquid, said member communicating on both sides thereof with the interior of said chamber whereby said member is balanced with the vapor pressure in said chamber.

11. In apparatus for separating a mixture of vapor and liquid into its respective constituents, a chamber provided with an inlet for said mixture and outlets for the separated vapor and liquid, valve means for controlling the liquid outlet, a pressure-respona cooling fan clamped between the shell and cover.

6. In combination with a driven part of an explosive engine, including a stationary shaft, a hub part journaled thereon, and a shell carried by the hub part, a pump including a cylinder secured to said shaft, the extremity of said shaft lying within the cylinder being reduced, and a rotor journaled on said reduced end, and means for imparting movement from the shell to the rotor.

7. In combination with a driven part of an explosive engine, including a hub part and a shell carried thereby, and a stationary shaft supporting the hub part, said shell being adapted to contain a quantity of lubricant, and means for deflecting lubricant inwardly from the outer portion of the shell to the shaft and hub part.

8. In combination with a driven part of an explosive engine, including a hub part and a shell carried thereby, and a stationary shaft supporting the hub part, said shell being adapted to contain a quantity of lubricant, means for deflecting lubricant inwardly from the outer portion of the shell to the shaft and hub part, a pump located in said shell and including a rotor, and means associated with the first mentioned means for conducting lubricant from the interior of the shell to the rotor.

9. In combination with a driven part of an explosive engine, including a shaft, a hub part journaled thereon, and a shell carried by the hub part, said shell being adapted to contain a lubricant, and said lubricant being adapted upon rotation of the shell, to be distributed over the inner portion of the latter by centrifugal force, and deflecting members arranged to deflect the lubricant into the bearing surface between the hub part and shaft.

10. In combination with a driven part of an explosive engine, including a shaft, a hub part journaled thereon, and a shell carried by the hub part, said shell being adapted to contain a lubricant, and said lubricant being adapted upon rotation of the shell, to be distributed over the inner portion of the latter by centrifugal force, deflecting members arranged to deflect the lubricant into the bearing surface between the hub part and shaft, a pump arranged in the shell and including a rotor actuated by the shell and journaled on said shaft, and means for conducting oil deflected by said deflecting members on to the bearing surfaces between the rotor and shaft.

11. In combination with a driven part of an explosive engine, including a shaft, a hub part journaled thereon, and a shell carried by the hub part, said shell being adapted to contain a lubricant, and said lubricant being adapted upon rotation of the shell, to be distributed over the inner portion of the latter by centrifugal force, deflecting members arranged to deflect the lubricant into the bearing surface between the hub part and shaft, a pump arranged in the shell and including a rotor actuated by the shell and journaled on said shaft, means for conducting oil deflected by said deflecting members on to the bearing surfaces between the rotor and shaft, said shaft extending externally of the shell, and an oil guard having a flanged part embracing the shell and surrounding the shaft.

12. In an internal combustion engine power plant, a hollow fixed supporting shaft, a cooling fan including a hub portion revolubly mounted on said shaft, an eccentric vacuum pump enclosed by said hub portion and driven thereby having its inlet in communication with said hollow shaft.

13. In an internal combustion engine power plant, a fixed supporting shaft, a driven fan mounted upon said shaft and including a hub part and a shell and an eccentric vacuum pump including a cylinder and a rotor enclosed in said shell and having an inlet and an outlet at one end thereof.

14. In an internal combustion engine power plant, a fixed shaft, a fan including a shell and a hub part carried thereby mounted upon said shaft, means for driving said hub, said shell having a closed end, a vacuum pump including a rotor and a cylinder arranged within said shell and hub, said cylinder being fixed to said shaft and means for imparting motion from the closed end of said shell to the rotor.

15. In an internal combustion engine power plant, a fixed shaft, a fan including a shell and a hub part revolubly mounted on said shaft, a vacuum pump including a rotor and a cylinder arranged within said shell and hub, said cylinder being fixed to said shaft and means for imparting motion from said shell to said rotor.

In testimony whereof I hereunto affix my signature.

ALBERT G. REDMOND.